(12) United States Patent
Sun et al.

(10) Patent No.: US 11,122,040 B1
(45) Date of Patent: Sep. 14, 2021

(54) SYSTEMS AND METHODS FOR FINGERPRINTING DEVICES

(71) Applicant: Symantec Corporation, Mountain View, CA (US)

(72) Inventors: Yuqiong Sun, San Jose, CA (US); Xueqiang Wang, Bloomington, IN (US); Susanta Nanda, San Jose, CA (US); Yun Shen, Reading (GB); Pierre-Antoine Vervier, Cagnes-sur-Mer (FR); Petros Efstathopoulos, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 314 days.

(21) Appl. No.: 16/233,366

(22) Filed: Dec. 27, 2018

(51) Int. Cl.
*H04L 29/06* (2006.01)

(52) U.S. Cl.
CPC ......... *H04L 63/0876* (2013.01); *H04L 63/10* (2013.01)

(58) Field of Classification Search
CPC .................... H04L 63/10; H04L 63/0876
See application file for complete search history.

(56) References Cited

U.S. PATENT DOCUMENTS 10,101,984 B1 * 10/2018 Keen ..................... G06F 8/61
10,616,255 B1 * 4/2020 Strauss ................ G06N 3/088
2017/0289176 A1 * 10/2017 Chen .................. H04L 63/1416
2019/0182278 A1 * 6/2019 Das ...................... H04W 4/70
2020/0065123 A1 * 2/2020 Yang ...................... G06F 9/455

OTHER PUBLICATIONS

"Fingerbank", Device Fingerprints, URL: https://fingerbank.org/, retrieved on Mar. 29, 2019, 2 pages.

Miettinen et al., "IoT SENTINEL: Automated Device-Type Identification for Security Enforcement in IoT", URL: http://ieeexplore.ieee.org/document/7980167/, IEEE 37th International Conference on Distributed Computing Systems (ICDCS), Jun. 5-8, 2017, 11 pages.

(Continued)

*Primary Examiner* — Alexander Lagor
*Assistant Examiner* — Vu V Tran
(74) *Attorney, Agent, or Firm* — FisherBroyles, LLP

(57) ABSTRACT

The disclosed computer-implemented method for fingerprinting devices may include (i) detecting that a new device has attempted to connect to a network gateway, (ii) attempting to fingerprint the new device as an instance of a known candidate device type by (a) transmitting to the new device, from a security application, a set of network messages that mimic network messages that a second application is configured to transmit to instances of the known candidate device type and (b) confirming, by the security application based on a response from the new device to the set of network messages, that the new device is the instance of the known candidate device type, and (iii) performing a security action to protect a network corresponding to the network gateway based on confirming that the new device is the instance of the known candidate device type. Various other methods, systems, and computer-readable media are also disclosed.

20 Claims, 6 Drawing Sheets

(56) References Cited

OTHER PUBLICATIONS

Franklin et al., "Passive Data Link Layer 802.11Wireless Device Driver Fingerprinting", URL: https://pdfs.semanticscholar.org/54f5/359ef8434116511a66bb0d9bed02f6bed38f.pdf, Proceedings of the 15th conference on USENIX Security Symposium, vol. 15, No. 12, Jul. 31-Aug. 4, 2006, pp. 1-12.

Jana et al., "On Fast and Accurate Detection of Unauthorized Wireless Access Points Using Clock Skews", URL: http://ieeexplore.ieee.org/document/5210105/, IEEE Transactions on Mobile Computing, vol. 9, No. 3, Mar. 2010, 2 pages.

Costin et al., "Towards Automated Classification of Firmware Images and Identification of Embedded Devices", URL: http://www.s3.eurecom.fr/docs/ifip17_costin_pdf, pp. 1-14.

* cited by examiner

SYSTEMS AND METHODS FOR FINGERPRINTING DEVICES

BACKGROUND

Internet-of-things devices in smart home settings are increasingly being targeted by attackers. To secure these devices, users may deploy host-based security agents, and yet these agents may suffer from a number of deficiencies. A better solution is to secure these devices at the network level, such as the level of the home gateway. The first step toward a network-based solution is to accurately fingerprint these Internet-of-things devices on the network. For example, fingerprinting these devices may include identifying a make, type, model, and/or firmware version for these devices. Upon fingerprinting these Internet-of-things devices, a security system may identify whether the devices contain specific vulnerabilities and may further identify what are intended network behavior patterns for the devices.

Nevertheless, accurate device fingerprinting is challenging for multiple reasons. First, many devices are based on the same hardware and/or software platform (e.g., the same WIFI chipset or the same LINUX OS). Consequently, hardware-based signatures such as MAC addresses or common software features (e.g., a DHCP/TCP/HTTP configuration) might not be sufficient to provide enough fine granularity to accurately and precisely fingerprint devices. Second, even if in some scenarios software features (e.g., the DHCP/TCP/HTTP configuration) are sufficient to fingerprint a device, a security system may first seek to obtain such features by observing the network traffic of the device. This involves purchasing the device (or downloading the firmware), setting up a clean lab environment, executing or simulating the device for an extended period of time, and then extracting the corresponding identification information for fingerprinting purposes. In view of the fast-paced continued evolution of Internet-of-things devices, the solution described above may not be scalable or economical. The instant disclosure, therefore, identifies and addresses a need for improved systems and methods for fingerprinting devices.

SUMMARY

As will be described in greater detail below, the instant disclosure describes various systems and methods for fingerprinting devices. In one example, a computer-implemented method for fingerprinting devices may include (i) detecting that a new device has attempted to connect to a network gateway, (ii) attempting to fingerprint the new device as an instance of a known candidate device type by (a) transmitting to the new device, by a security application, a set of network messages that mimic network messages that a second application is configured to transmit to instances of the known candidate device type and (b) confirming, by the security application based on a response from the new device to the set of network messages, that the new device is the instance of the known candidate device type, and (iii) performing a security action to protect a network corresponding to the network gateway based on confirming that the new device is the instance of the known candidate device type.

In one embodiment, the network gateway executes the security application. In one embodiment, the set of network messages is unique according to a backend server analysis of multiple device-specific applications indicating that the second application is configured to transmit the set of network messages while a remainder of the multiple device-specific applications is not so configured.

In one embodiment, the set of network messages is identified by: (i) crawling an online application distribution platform, (ii) performing a network message analysis for each one of multiple device-specific applications extracted from the online application distribution platform, and (iii) detecting, based on each respective network message analysis, a respective set of network messages that uniquely identifies each one of the multiple device-specific applications.

In one embodiment, the network message analysis may include (i) dynamic analysis based on an execution of a respective device-specific application, (ii) static analysis based on disassembling code for the respective device-specific application, and/or (iii) symbolic execution of the respective device-specific application. In one embodiment, the new device may include an Internet-of-things device. In one embodiment, the second application is specific to the Internet-of-things device and the second application may include an Internet-of-things management application that executes on a user mobile device to pair the user mobile device with the Internet-of-things device and manage the Internet-of-things device.

In some examples, fingerprinting the new device may include identifying at least two of: (i) a make of the new device, (ii) a type of the new device, (iii) a model of the new device, and (iv) a firmware version of firmware installed on the new device. In one embodiment, the set of network messages are extracted based on an analysis of the second application. In one embodiment, the set of network messages are extracted based on the analysis of the second application without access to any instance of the known candidate device type.

In one embodiment, a system for implementing the above-described method may include (i) a detection module, stored in memory, that detects that a new device has attempted to connect to a network gateway, (ii) a fingerprinting module, stored in memory, that attempts to fingerprint the new device as an instance of a known candidate device type by (a) transmitting to the new device, as part of a security application, a set of network messages that mimic network messages that a second application is configured to transmit to instances of the known candidate device type and (b) confirming, as part of the security application and based on a response from the new device to the set of network messages, that the new device is the instance of the known candidate device type and, (iii) a performance module, stored in memory, that performs a security action to protect a network corresponding to the network gateway based on confirming that the new device is the instance of the known candidate device type, and (iv) at least one physical processor configured to execute the detection module, the fingerprinting module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that a new device has attempted to connect to a network gateway, (ii) attempt to fingerprint the new device as an instance of a known candidate device type by (a) transmitting to the new device, by a security application, a set of network messages that mimic network messages that a second application is configured to transmit to instances of the known candidate device type and (b)

confirming, by the second application based on a response from the new device to the set of network messages, that the new device is the instance of the known candidate device type, and (iii) perform a security action to protect a network corresponding to the network gateway based on confirming that the new device is the instance of the known candidate device type.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
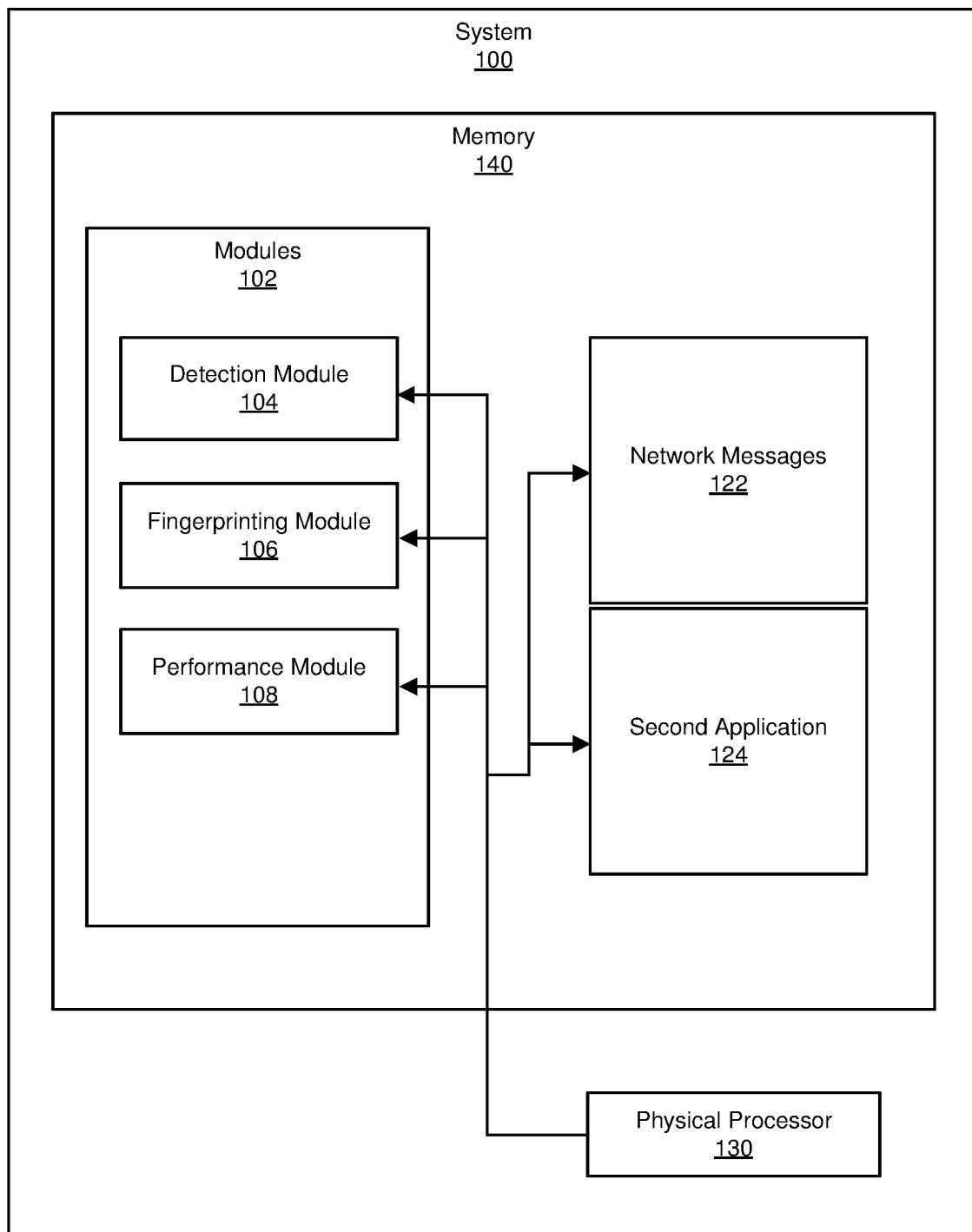
FIG. 1 is a block diagram of an example system for fingerprinting devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for fingerprinting devices. The disclosed subject matter may improve upon related systems by increasing the level of detail and accuracy of fingerprinting systems that fingerprint the device types of devices connected to computing networks. For example, related systems may fingerprint devices at the hardware level based on a media access control address or an analogous hardware-level identifier. Even when related systems attempt to fingerprint devices based on a software configuration, these related systems may suffer from a deficiency according to which multiple different types of devices use the same general software configuration (e.g., the same network configuration or platform), thereby preventing more finely grained fingerprinting from succeeding.

In view of the above, the disclosed subject matter may improve upon these related systems by leveraging one or more network messages that uniquely identify a device type. For example, a type of Internet-of-things device, such as a smart watch or a smart refrigerator, may be configured to execute a specific series of network messages back and forth with a management application executing on a user mobile device, such as a smart phone or a tablet. The disclosed subject matter may involve analyzing the management application to extract the unique series of network messages. In some cases, the disclosed subject matter may optionally perform the analysis of the management application to extract the unique series of network messages without even possessing access to one or more instances of the corresponding network device type. Moreover, the disclosed subject matter may analyze a large set of similar management applications, where each respective management application corresponds to a different and unique respective Internet-of-things device type. By analyzing the large set of management applications, the analysis may confirm that the series of network messages is unique to one specific management application for a corresponding specific Internet-of-things device, as distinct from a remainder of the large set of management applications.

Upon identifying the specific series of one or more network messages, a security system, which may be external to the management application for the Internet-of-things device itself, may thereby transmit a mimicked or copied version of the one or more network messages to a newly encountered and unknown device that is attempting to connect to a network. Accordingly, the security system may attempt to simulate the management application and thereby create the illusion, from the perspective of the new unknown device, of an authentic management application. The security system may subsequently listen to check whether the new unknown device responds to the one or more network messages with one or more response messages that confirm the candidate device type corresponding to this message exchange. Alternatively, the new unknown device may fail to transmit responses confirming the candidate device type. Accordingly, the disclosed subject matter may then optionally attempt to transmit a different series of one or more network messages that are unique to a different and alternative candidate device type. In this manner, the disclosed subject matter may cycle through a number of network message attempts, where each attempt corresponds to a different respective unique exchange between a different unique Internet-of-things device and its user management application. When cycling through the number of network message attempts, the security system may potentially eventually hit upon responses from the new unknown device that confirm an identity corresponding to a known candidate device type. Accordingly, the disclosed subject matter may improve upon related systems, using the technique described above, to thereby identify network devices with a higher level of granularity, accuracy, and sophistication than related systems, such as those based on media access control identifiers, as further outlined above.

Figure 2:
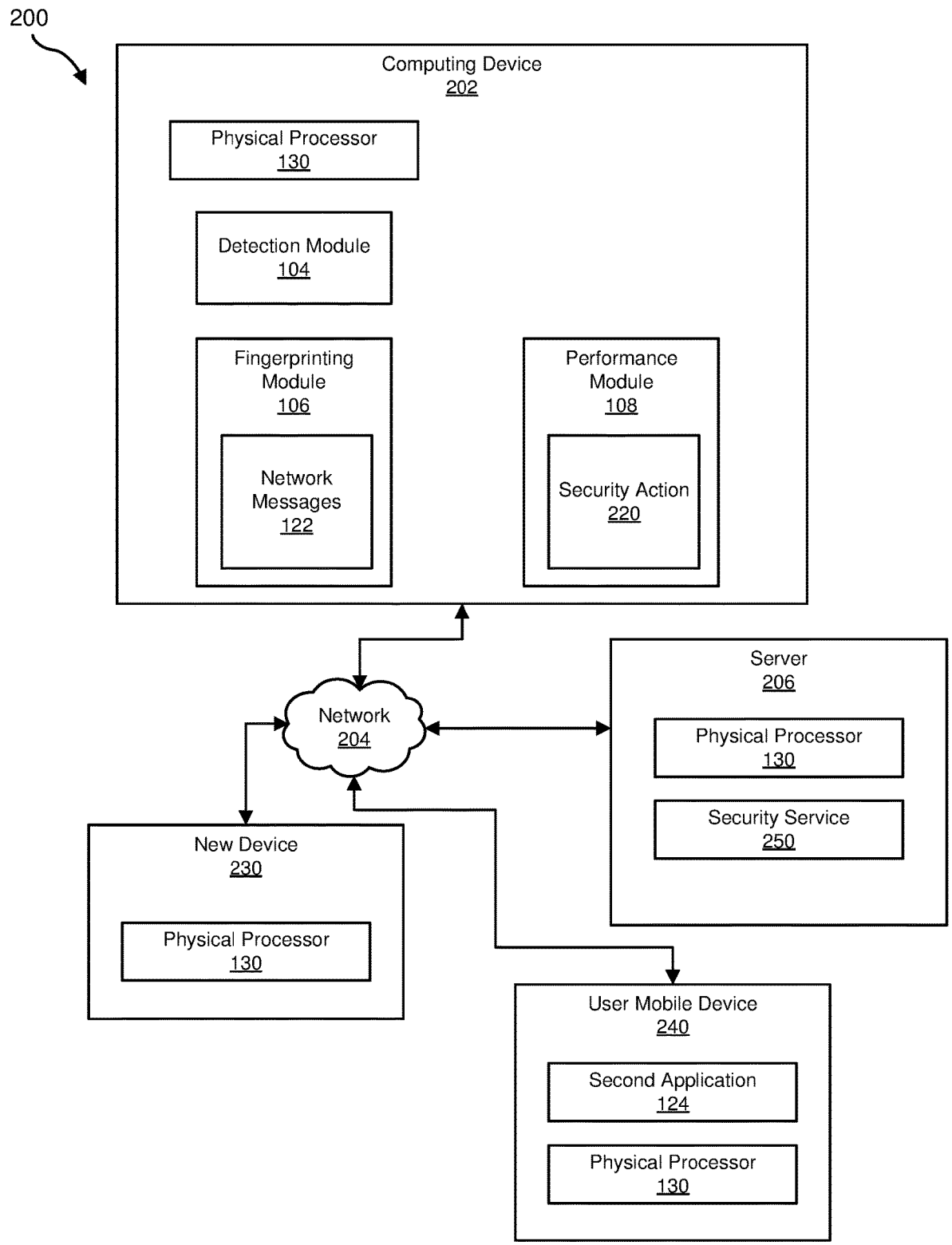
FIG. 2 is a block diagram of an additional example system for fingerprinting devices.

The following will provide, with reference to FIGS. 1-2, detailed descriptions of example systems for fingerprinting devices. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for fingerprinting devices. As illustrated in this figure, example system 100 may include one or more modules 102 for performing one or more tasks. For example, and as will be explained in greater detail below, example system 100 may include a detection module 104 that detects that a new device has attempted to connect to a network gateway. Example system 100 may additionally include a fingerprinting module 106 that attempts to fingerprint the new device as an instance of a known candidate device type by transmitting to the new device, as part of a security application, a set of network messages, such as network messages 122, that mimic network messages that a second application, which may be specific to the known candidate device type, such as a second application 124, is configured to transmit to instances of the known candidate device type. Fingerprinting module 106 may also further attempt to fingerprint the new device by subsequently confirming, as part of the security application and based on a response from the new device to the set of network messages, that the new device is the instance of the known candidate device type. Example system 100 may additionally include a performance module 108 that performs a security action to protect a network corresponding to the network gateway based on confirming that the new device is the instance of the known candidate device type. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate fingerprinting devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to fingerprint devices.

For example, and as will be described in greater detail below, detection module 104 may detect that a new device, such as a new device 230, has attempted to connect to a network gateway (e.g., computing device 202) for a network 204. Fingerprinting module 106 may attempt to fingerprint new device 230 as an instance of a known candidate device type by transmitting to new device 230, as part of a security application, a set of network messages, such as network messages 122, that mimic network messages that a second application, such as an Internet-of-things management application corresponding to second application 124 and executing on a user mobile device 240, and which may be specific to the known candidate device type, is configured to transmit to instances of the known candidate device type. Fingerprinting module 106 may further fingerprint new device 230 by subsequently confirming, as part of the security application and based on a response from new device 230 to the set of network messages that new device 230 is the instance of the known candidate device type. Performance module 108 may perform a security action 220 to protect network 204 based on confirming that new device 230 is the instance of the known candidate device type.

Computing device 202 generally represents any type or form of computing device capable of reading computer-executable instructions. In some illustrative examples, computing device 202 may correspond to a smart security network gateway device, such as the NORTON CORE. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that may facilitate the performance of method 300, as discussed in more detail below. In some illustrative examples, server 206 may correspond to a back-end server of a security vendor, such as SYMANTEC, and server 206 may coordinate with computing device 202 such as by analyzing, extracting, transmitting, and/or applying network messages 122 (e.g., based on server 206 analyzing a multitude of different user management applications for corresponding Internet-of-things devices). Moreover, in some examples, server 206 may facilitate the performance of method 300 by providing a security service 250. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
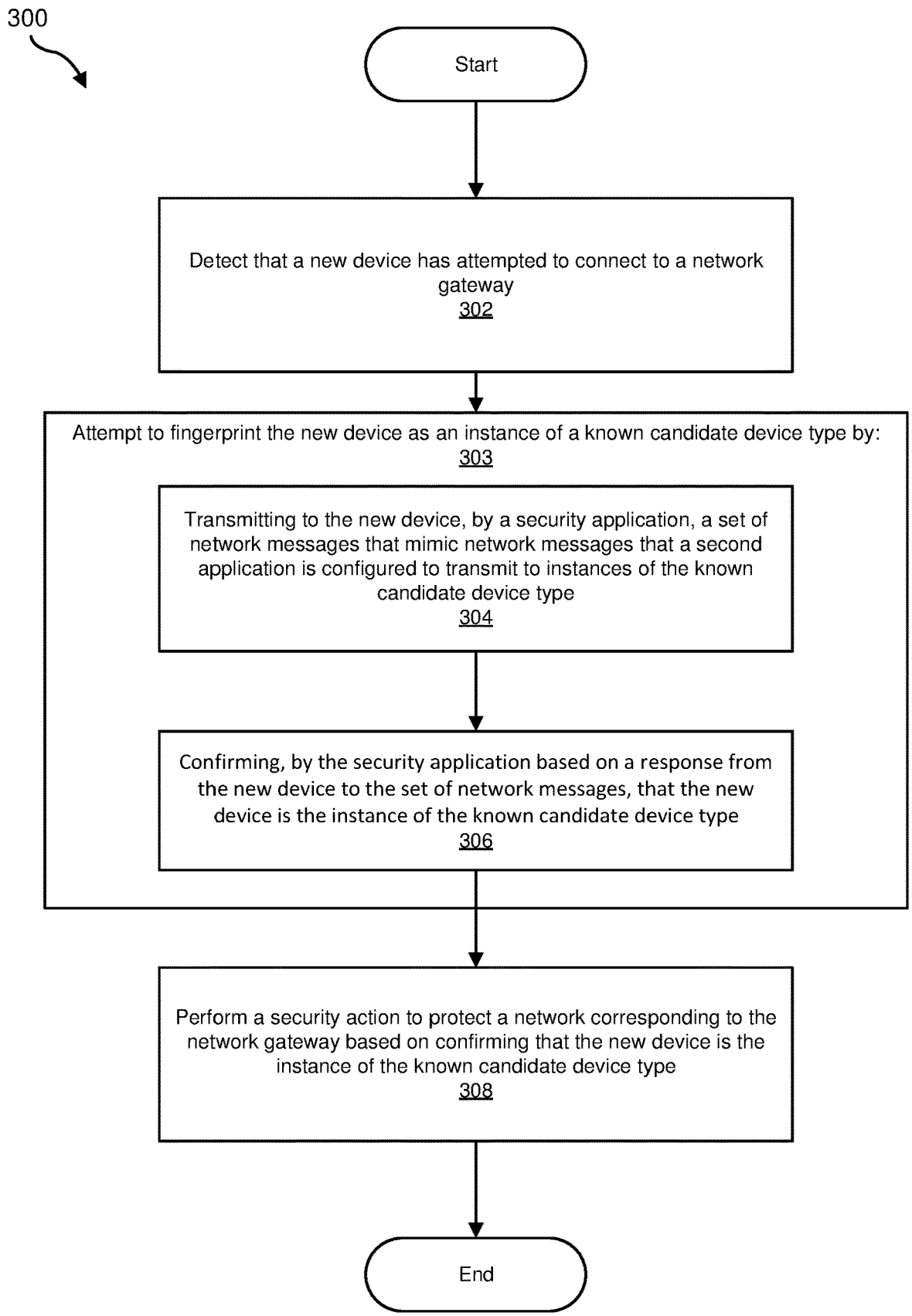
FIG. 3 is a flow diagram of an example method for fingerprinting devices.

FIG. 3 is a flow diagram of an example computer-implemented method 300 for fingerprinting devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that a new device has attempted to connect to a network gateway. For example, detection module 104 may, as part of computing device 202 in FIG. 2, detect that new device 230 has attempted to connected to computing device 202. As used herein, the term "new device" generally refers to any device that is attempting to connect to a network such that computing device 202 may attempt to perform a fingerprinting procedure, corresponding to method 300, to improve an identification of the device and to thereby improve the ability of a security system to protect a corresponding network based on the enhanced identification of the device.

Detection module 104 may detect that the new device has attempted to connect to the network gateway in a variety of ways. In general, computing device 202, functioning as a network gateway, may receive one or more network packets or other messages that the new device transmitted. The new device may have transmitted one or more of these messages in order to attempt to connect to the network gateway. For example, the new device may have transmitted one or more network messages as part of the initiation of a network handshake. The network handshake may establish a corresponding network connection. In some examples, the network may include a local area wireless network and the network gateway may correspond to a wireless local area network router. In further examples, the network gateway may include a smart security network gateway, such as NORTON CORE, which may provide home network security functionality in addition to providing wireless local area network router functionality. For example, the home network security functionality may correspond to system 200 of FIG. 2 and method 300 of FIG. 3, as discussed in more detail below. In more specific examples, the new device may have transmitted one or more network messages to the network gateway in order for the network gateway to act as an intermediary that forwards the network messages to a corresponding management application, such as second application 124 that is executing on user mobile device 240, as further discussed above in connection with FIG. 2. In further examples, the second application that is specific to the Internet-of-things device may include an Internet-of-things management application that executes on a user mobile device to pair the user mobile device with the Internet-of-things device and manage the Internet-of-things device. Moreover, in some illustrative examples the new device may include an Internet-of-things device, such as a smart thermostat or a smart refrigerator. In some examples, the term "Internet-of-things device" may refer to an Internet-enabled appliance.

From step 302, method 300 may proceed to step 303, which may further include substeps 304 and 306. At step 303 and subset 304, one or more of the systems described herein may attempt to fingerprint the new device as an instance of a known candidate device type by transmitting to the new device, by a security application, a set of network messages that mimic network messages that a second application is configured to transmit to instances of the known candidate device type. For example, fingerprinting module 106 may attempt to fingerprint new device 230 as an instance of a known candidate device type by transmitting to new device 230, as part of the security application, the one or more network messages corresponding to network messages 122 that mimic the one or more network messages that second application 124, which may be specific to the known candidate device type, is configured to transmit to instances of the known candidate device type. As used herein, the term "known candidate device type" generally refers to a type of device such that a manufacturer of the device has manufactured multiple instances of that type of device, the type of the device has been previously encountered or identified by the corresponding security system, such as system 200 of FIG. 2, and identifying or fingerprinting the new device as having the known candidate device type improves or enhances the ability of the corresponding security system to protect the network (e.g., because the security system may customize or tailor the application of one or more security policies based on the specifics of vulnerabilities and/or risks associated with the known candidate device type). Illustrative examples of known candidate device types may include permutations of two or more of the make of the device, the model of the device, the type of the new device, and/or the version of the firmware of the new device, etc.

As used herein, the phrase "set of network messages" generally refers to a set that includes one or more such messages. The set may be "unique" in the sense that, from among multiple analyzed applications, the set of network messages have a configuration, content, and/or format that would only apply to one specific application (i.e., second application 124) and furthermore would not apply to any one of the remaining multiple analyzed applications, such that the set of network messages picks out, or uniquely identifies, the one specific application from among the entire set of multiple analyzed applications, as discussed in more detail below.

Fingerprinting module 106 may perform step 304 in a variety of ways. In general, fingerprinting module 106 may perform step 304 by transmitting at least one network message to the new device. The network message may be identical to a network message that second application 124 is configured to transmit to the new device. Additionally, or alternatively, the network message may be based on the network message that second application 124 is configured to transmit to the new device, without actually being identical. In this scenario, the network message of step 304 that is based on the network message that second application 124 is configured to transmit to the new device may nevertheless still uniquely identify a type of the new device, as further discussed above.

In this manner, fingerprinting module 106 may effectively create the illusion, from the perspective of the new device, of second application 124 initiating communication with the new device. In other words, fingerprinting module 106 may simulate communication from second application 124 to the new device by copying, or otherwise simulating, one or more network messages that second application 124 is configured to transmit to the new device. Moreover, the specific network message transmitted at step 304 to the new device may belong to a larger network message exchange, whereby the larger network message exchange uniquely identifies a type or fingerprint of the new device, in accordance with the methodology further outlined above. For example, the larger network message exchange may constitute a simple first mimicked message transmitted to the new device and a first single response message that the new device transmits in response to receiving the first mimicked message. In other examples, the larger network message exchange may include a larger sequence of message-and-reply pairs (e.g., where each pair constitutes both the initial message to the new device and the corresponding responsive reply from the new device), including a first message-and-reply pair, where the first message is transmitted to the new device and the reply is transmitted back from the new device to computing device 202, which may trigger a second message-and-reply pair, and so on.

In one embodiment, the set of network messages is unique according to a backend server analysis of multiple device-specific applications indicating that the second application is configured to transmit the set of network messages while a remainder of the multiple device-specific applications is not so configured. Additionally, or alternatively, the set of network messages may be identified by: (i) crawling an online application distribution platform, (ii) performing a network message analysis for each one of multiple device-specific applications extracted from the online application distribution platform, and (iii) detecting, based on each respective network message analysis, a respective set of network messages that uniquely identifies each one of the multiple device-specific applications.

In these examples, a security service, such as security service 250 executing on server 206 of a security vendor, such as SYMANTEC, may begin by crawling an online application distribution platform, such as the APPLE APP STORE and/or the GOOGLE PLAY STORE. By crawling the online application distribution platform, the security service 250 may optionally download, or otherwise analyze, a multitude of different applications made available on the platform. For example, security service 250 may optionally download a multitude of different applications, where each application is a user management application that is specific to a corresponding respective Internet-of-things device. As a more specific example, security service 250 may download a user management application for a smart refrigerator device, download a user management application for a smart watch, and download a user management application for a smart thermostat, etc. Upon extracting the multitude of different user management applications for respective Internet-of-things devices, security service 250 may perform the network message analysis for each one of these downloaded user management applications. The respective network message analysis for each one of the downloaded user management applications may include one or more of: (i) a dynamic analysis based on an execution of a respective device-specific application, (ii) a static analysis based on disassembling code for the respective device-specific application, and (iii) a symbolic execution of the respective device-specific application.

Performing the network message analysis for each one of the respective user management applications may enable security service 250 to identify or extract a set of network messages that uniquely identifies or fingerprints each respective user management application, and thereby also identifies the corresponding respective Internet-of-things device that communicates with the user management application using such messages. Returning to the example outlined above, security service 250 may identify a unique network message exchange that occurs between the smart refrigerator Internet-of-things device and its corresponding user management application. The specific content, configuration, and/or formatting of this unique network message exchange may be unique to the smart refrigerator Internet-of-things device such that the unique network message exchange would not occur between any other type of device and its corresponding user management application. Similarly, security service 250 may identify an additional unique network message exchange that occurs between the smart watch Internet-of-things device and its corresponding user management application. This network message exchange may be unique to the smart watch in a manner that parallels the unique network message exchange discussed above in connection with the smart refrigerator Internet-of-things device, and so on.

In one embodiment, the set of network messages are extracted based on the analysis of the second application without access to any instance of the known candidate device type. In other words, in these scenarios security service 250 at server 206 may analyze the multitude of different user management applications to successfully extract unique or fingerprinting network messages, as further outlined above, without security service 250 having any access to an actual instance of the corresponding Internet-of-things device. For example, security service 250 may analyze one specific application to determine both an initial message that the specific application is configured to transmit to a corresponding Internet-of-things device and also an expected response message that the specific application is configured to receive from the Internet-of-things device. In these examples, security service 250 may determine the expected response message simply based on the analysis of the user management application, without having any access to an actual instance of the corresponding Internet-of-things device. Eliminating a requirement to possess access to an actual instance of the corresponding Internet-of-things device may improve upon related techniques, because access to such devices may be difficult, challenging, or even impossible, especially at the early stages of releasing these devices, and yet security services, such as security service 250 may seek to fingerprint these devices, and provide corresponding improvements to security for protected end users, as early as possible.

At step 306, one or more of the systems described herein may confirm, based on a response from the new device to the set of network messages, that the new device is the instance of the known candidate device type. For example, fingerprinting module 106 may confirm, as part of the security application and based on a response from new device 230 to network messages 122, that new device 230 is the instance of the known candidate device type.

Fingerprinting module 106 may check whether the response from the new device confirms that the new device has the known candidate device type in a variety of ways. In general, fingerprinting module 106 may already store or contain a security policy that defines valid and invalid replies to the message transmitted at step 304, as further discussed above. The security policy may define a valid reply as a reply that contained a specific and unique string of text. Additionally, or alternatively, the security policy may define a valid reply as a reply that satisfies one or more specific patterns, configurations, and/or types of formatting. In this latter scenario, the security policy may be nevertheless satisfied by multiple different permutations of strings of text, because multiple different permutations of strings of text may all satisfy or conform to a specific pattern, configuration, and/or formatting. Moreover, in some examples fingerprinting module 106 may apply a security policy that defines an invalid reply as any reply that does not constitute a valid reply, as further outlined above.

Moreover, at step 306 fingerprinting module 106 may check whether the response from the new device confirms that the new device has the known candidate device type by analyzing an entire message exchange, as further discussed above. In some examples, the entire message exchange may just include a single transmission at step 304 to the new device and a corresponding single reply back from the new device at step 306. Alternatively, in other examples the entire message exchange may include multiple respective message-and-reply pairs, as further discussed above. Accordingly, in these examples, fingerprinting module 106 may check whether each reply, for each message-and-reply pair, is valid. Nevertheless, earlier replies in a sequence of multiple respective message-and-reply pairs may be valid without yet finalizing a confirmation that the new device has the corresponding candidate device type. Accordingly, earlier replies in the sequence of multiple respective message-and-reply pairs may continue the identification of the new device as a candidate for having the corresponding candidate device type. At any point along the entire message exchange including the multiple respective message-and-reply pairs, an invalid reply identified by fingerprinting module 106 may confirm that the new device does not have the candidate device type. In contrast, if the new device successfully transmits valid replies for each one of the message-and-reply pairs within the entire message exchange, then the final valid reply may finalize the confirmation that the new device has the candidate device type that is uniquely identified by that entire message exchange.

As one illustrative example of an entire message exchange that includes a sequence of multiple message-and-reply pairs, a first message-and-reply pair may include a message to the new device and a reply that confirms that the new device has a make of a hardware manufacturer brand, such as SONY. Upon receiving confirmation that the new device has the specific hardware manufacturer brand, fingerprinting module 106 and fingerprinting module 106 may coordinate to trigger a subsequent message-and-reply pair, which may attempt to further drill down on the specifics of the identity or fingerprinting of the new device. For example, the second and subsequent message-and-reply pair may attempt to confirm a model of the new device. As one illustrative example, the second and subsequent message-and-reply pair may confirm that the new device corresponds to a smart refrigerator Internet-of-things device. At this point, each of the previous two replies may constitute valid replies by fingerprinting module 106. Accordingly, fingerprinting module 106 and fingerprinting module 106 may further coordinate to continue to drill down on the specifics of the identity of the new device.

More specifically, in this illustrative example, fingerprinting module 106 may attempt to identify the specific version of the firmware that is executing on the specific SONY smart refrigerator Internet-of-things device. Fingerprinting module 106 may have previously identified three separate versions of firmware that have been applied in the field to different instances of this specific SONY smart refrigerator Internet-of-things device. Accordingly, fingerprinting module 106 may coordinate to initiate message-and-reply pairs, where each one of these message-and-reply pairs uniquely identifies a respective one of the previously identified versions of firmware for the smart refrigerator Internet-of-things device. After first transmitting the first one of these message-and-reply pairs, a valid reply from the new device may confirm the corresponding identity of the version of the firmware. Alternatively, an invalid reply from the new device may result in fingerprinting module 106 initiating a second and subsequent one of these message-and-reply pairs. In this manner, fingerprinting module 106 may cycle through a number of different potential message-and-reply pairs while seeking a valid reply that confirms a type and/or fingerprinting of the new device, as further discussed above.

Figure 4:
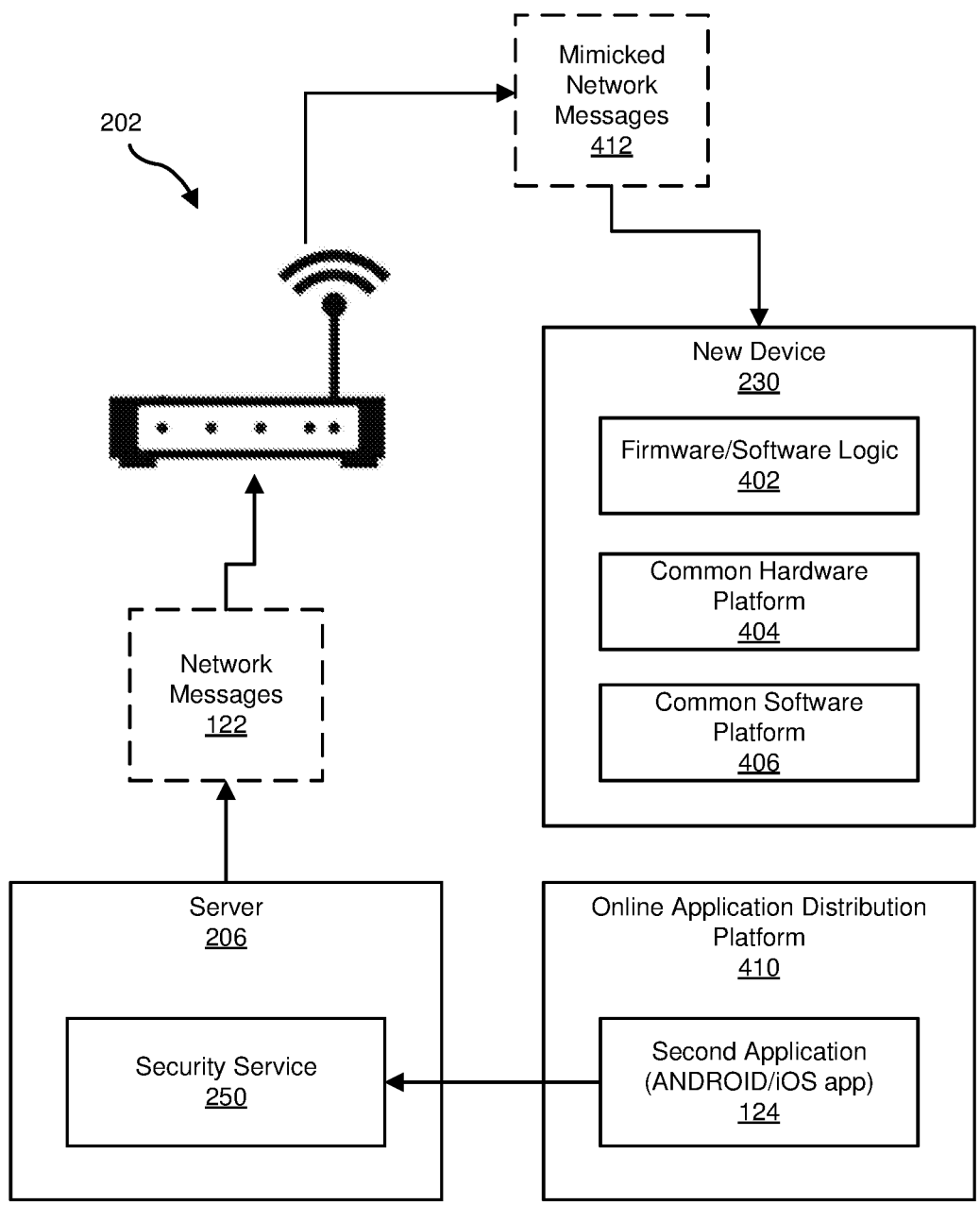
FIG. 4 is an illustration of a workflow corresponding to the example method for fingerprinting devices.

FIG. 4 illustrates a helpful workflow in accordance with example method 300. As further shown in this figure, the workflow may begin with security service 250 at server 206 crawling an online application distribution platform 410 and extracting second application 124. As further discussed above, second application 124 may correspond to a user management application that pairs with a respective Internet-of-things device to enable the user at a user mobile device to control and manage the Internet-of-things device. Security service 250 may download second application 124 from an online application distribution platform such as the GOOGLE PLAY STORE and/or the APPLE APP STORE. After performing the crawling and extracting, security service 250 may extract network messages 122, as outlined above in connection with step 304. Security service 250 may provide information regarding network messages 122 to computing device 202, which may correspond to a smart security network gateway device.

In view of the above, modules 102 at computing device 202 may directly probe new device 230 by transmitting mimicked network messages 412, which may be based on network messages 122, or which may directly copy network messages 122, to new device 230. Alternatively, in some scenarios computing device 202 may first provide information regarding network messages 122 to a security application executing on user mobile device 240 of FIG. 2. In these scenarios, the security application executing on user mobile device 240, which may be external to second application 124 executing on the user mobile device 240, may then probe new device 230 in accordance with method 300. In either scenario (e.g., computing device 202 directly probing new device 230 or the security application at user mobile device 240 acting as an intermediary), modules 102 may effectively simulate second application 124 attempting to communicate with new device 230. As further illustrated in FIG. 4, new device 230 may contain a common hardware platform 404 and a common software platform 406, both of which may present challenges when attempting to fingerprint new device 230. In contrast, new device 230 may also contain firmware/software logic 402, which may operate at the application layer of a corresponding network model, such as the OSI model, and firmware/software logic 402 may enable security service 250 to effectively fingerprint new device 230 by identifying a message exchange that is unique to the combination of new device 230 and its pairing application, which corresponds to second application 124.

At step 308, one or more of the systems described herein may perform a security action to protect a network corresponding to the network gateway based on confirming that the new device is the instance of the known candidate device type. For example, performance module 108 may, as part of computing device 202 in FIG. 2, perform security action 220 to protect network 204 based on confirming that new device 230 is the instance of the known candidate device type.

Performance module 108 may perform step 308 in a variety of ways. For example, performance module 108 may perform any one or more permutations of the illustrative examples of security actions that are listed below. As used herein, the term "security action" generally refers to any action, command, instruction, and/or application of a security policy that computing device 202 and/or a security application executing at user mobile device 240 may perform or apply such that the protection of the corresponding network, the protection of user mobile device 240, and/or the protection of new device 230 is improved. Illustrative examples of security actions may include heightening or enabling one or more security settings, limiting or removing one or more access privileges, issuing one or more warnings, alerts, and/or security notifications to the user and/or an administrator, updating or applying one or more security patches, scripts, and/or executables, and/or shutting down, quarantining, sandboxing, and/or isolating one or more computing or network resources. Moreover, any one or more permutations of the above illustrative examples of security actions may be specifically tailored and/or customized to the specific details, including vulnerability and/or security risk details, that correspond to the known candidate device type that is confirmed at step 306 as the device type of new device 230.

The above discussion provides a general overview of the subject matter relating to method 300 of FIG. 3. Additionally, the following discussion provides a supplementary overview of concrete and detailed embodiments of the disclosed subject matter.

This application proposes a network probing-based approach for fingerprinting Internet-of-things devices with increased accuracy. Additionally, the approach outlined here does not necessarily involve access to an actual instance of the corresponding Internet-of-things device in order to successfully extract fingerprints for the Internet-of-things device. Accordingly, the disclosed subject matter increases scalability and practicality.

The disclosed subject matter is directed in part to a local scenario where Internet-of-things devices communicate with pairing applications (e.g., user management applications executing on user mobile devices, such as smartphones or tablets, which may operate the ANDROID or iOS operating system). The pairing applications may communicate with the Internet-of-things devices through a network router, such as a wireless local area network router, rather than communicate through a cloud service. This is the most common scenario for a variety of reasons, including: (i) many Internet-of-things device vendors do not have the budget for a dedicated cloud service for managing these Internet-of-things devices and (ii) even for those vendors that provide a cloud service, a local mode is often available in the case of Internet or backend outages. In fact, for the top 100 most popular IoT devices (e.g. according to smarthomedb.com), about 68% of them support local control.

In addition, the disclosed subject matter focuses on the use of a local area network, such as a WIFI network, and more specifically any TCP/IP-based communication channel between the Internet-of-things devices and their corresponding applications. According to one embodiment the disclosed subject matter (e.g., fingerprinting module 106) operates at the application level according to the OSI network model and/or other analogous network models, and therefore the disclosed subject matter is largely agnostic to protocols that are operating at one or more remaining layers of the network model (e.g., the transport layer). Consequently, the disclosed subject matter may operate in accordance with other protocols as well, including BLUETOOTH, ZIGBEE, etc. In these scenarios, the disclosed subject matter may operate using one or more of these listed protocols as long as the network gateway is able to communicate with the device through these protocols.

One key insight reflected by the disclosed subject matter is the idea to simulate application-level unique message exchanges between the Internet-of-things device and its pairing Internet-of-things mobile application to thereby fingerprint the Internet-of-things device. While Internet-of-things devices may be based on the same hardware/software platform, the applications running on top are typically different and unique. Such differences are also reflected in the control applications available from the corresponding online application distribution platform, which a user may operate to control and manage the Internet-of-things device through a mobile phone or tablet, for example. These unique message exchanges may thereby accurately fingerprint the Internet-of-things device.

In view of the above, the disclosed subject matter may extract unique messages that are exchanged between an Internet-of-things device and its pairing application. Furthermore, the disclosed subject matter may utilize these unique messages to probe the Internet-of-things device, test its response, and with information crawled from the online application distribution platform, accurately fingerprint the Internet-of-things device. Moreover, because this information is available inside of the pairing management application, the disclosed subject matter operating at a backend security server does not necessarily require access to any physical instance of the Internet-of-things device in order to build the corresponding fingerprints of the Internet-of-things device. For example, when the Internet-of-things device becomes available, the pairing management application often becomes available on the corresponding online application distribution platform.

To extract and identify the fingerprints of Internet-of-things devices, the disclosed subject matter may operate at a backend security server to crawl the online application distribution platform to download as many Internet-of-things control applications as possible or practical. Each application may be investigated through a combination of dynamic analysis, static analysis, and symbolic execution, as further outlined above. These analyses may identify the request messages that the application produces and that would trigger a distinguishable or unique response from a paired Internet-of-things device. These request messages and unique responses may be recorded into a database stored at the backend server along with the Internet-of-things application description crawled from the online application distribution platform. For example, these items of information may include the vendor name, the type of the device, the model of the device, etc. This information may optionally be used later by the network security gateway, such as a home router, to identify the Internet-of-things devices.

Once an Internet-of-things device joins a network, such as a wireless local area network, the security gateway can probe the device by sending the request messages stored in the backend database. The security gateway can also compare the response, if any, with the database to determine the make, type, and model of the device, etc. If the Internet-of-things device does not respond to a specific request, or the response is a generic error message (e.g., the request cannot be parsed), then the security gateway may conclude that the Internet-of-things device does not match the request message and therefore the security gateway may optionally move on to the next request message to test for a corresponding alternative candidate device type.

In practice, the unique messages can be constructed in a certain way to avoid a linear search space. For example, the first message transmitted can be used to identify if a device corresponds to vendor BRAND A or vendor BRAND B. Subsequently, the disclosed subject matter may transmit follow-up messages, which may be used to further identify the model and firmware version of the device. In this scenario, when extracting information from the online application distribution platform, the disclosed subject matter may potentially extract messages that are unique not only to a specific device, but also other unique messages that are specific to a group of devices with one or more similar properties (e.g., all of the devices in the group of devices come from the same manufacturer).

The most popular trust model assumed by Internet-of-things devices is that the local network, such as the wireless local area network, is trusted. This means that if a device, (e.g., a phone, computer, or other device) can join the home network, then the Internet-of-things device assumes that the joining device can be trusted. Therefore the majority of Internet-of-things devices either communicate with the pairing control application through plaintext or, instead, use a very simple form of encryption, whereby the messages are XORed with a built-in key. Because of this fact, the security gateway can simply reply with application-level unique messages, without the need to worry about the messages not being valid due to encryption. In a rare scenario where the Internet-of-things device establishes a live encrypted session with the control application (e.g., the Internet-of-things device negotiates a symmetric key with the control application and encrypts future application-level communication with the key), then simply replaying the unique messages might not necessarily succeed. In this scenario, the security gateway may optionally establish a session with the Internet-of-things device itself to send application-level request messages. This can potentially be accomplished through reverse engineering of the Internet-of-things application to extract the private key that was used to negotiate the symmetric key with the device, and then use the same key for the security gateway to communicate with the Internet-of-things device.

In some scenarios, Internet-of-things devices do not necessarily have a keyboard or a screen, nor do they directly connect to the device vendor server. The control of these devices is primarily accomplished through the paired phone applications. Accordingly, the vendors for these devices often provide a direct application-level API for the pairing management application to query the current firmware version and also potentially update the firmware in case the firmware is outdated. Leveraging these insights, the disclosed subject matter can provide an easy way to fingerprint the firmware version of the Internet-of-things device. Once the security gateway determines the make and model of the device, the security gateway can directly invoke the device-specific application-level API call of that make and model to figure out the exact firmware version. Application-level API requests may be constructed during analysis of the Internet-of-things device management application.

Figure 5:
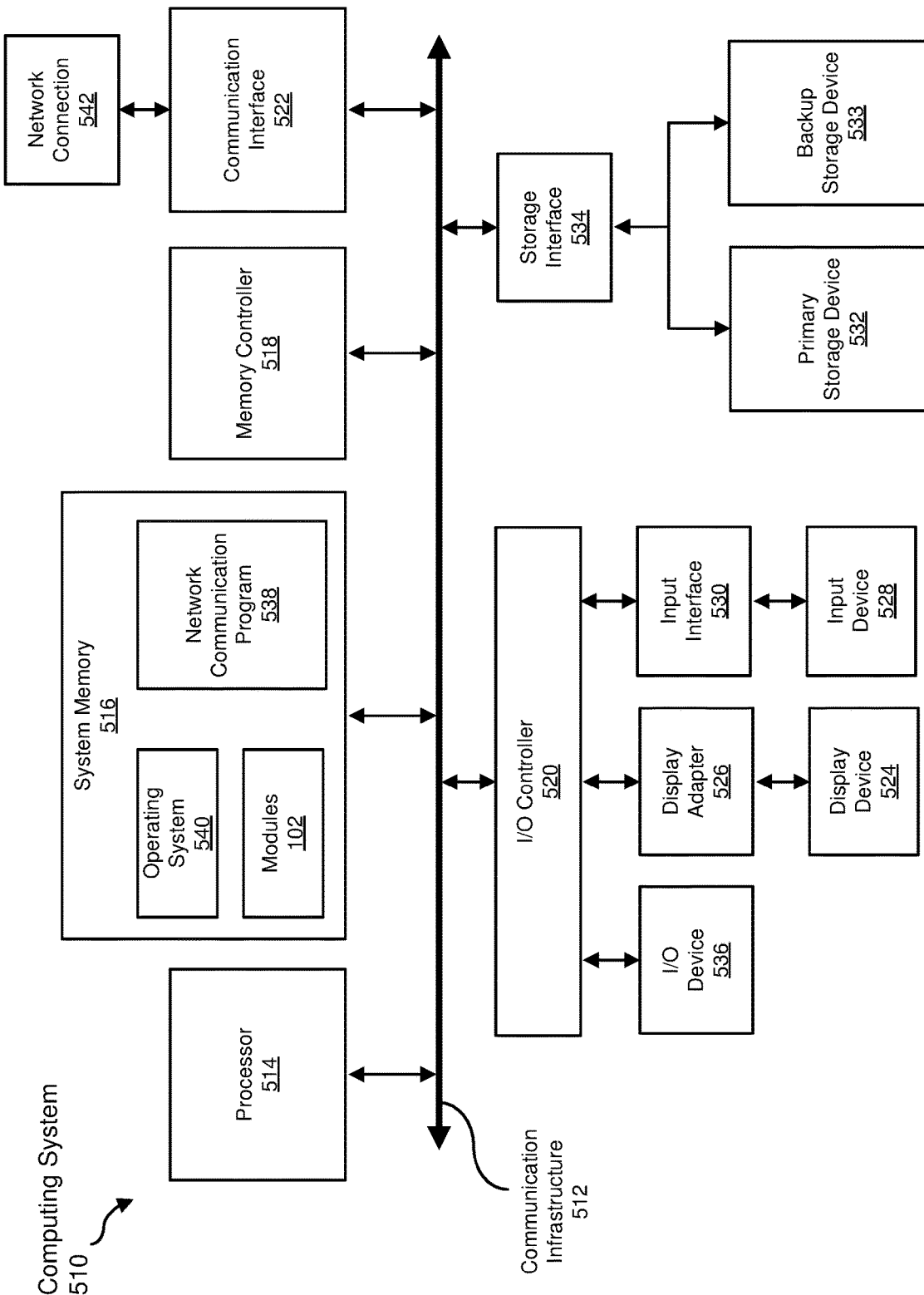
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
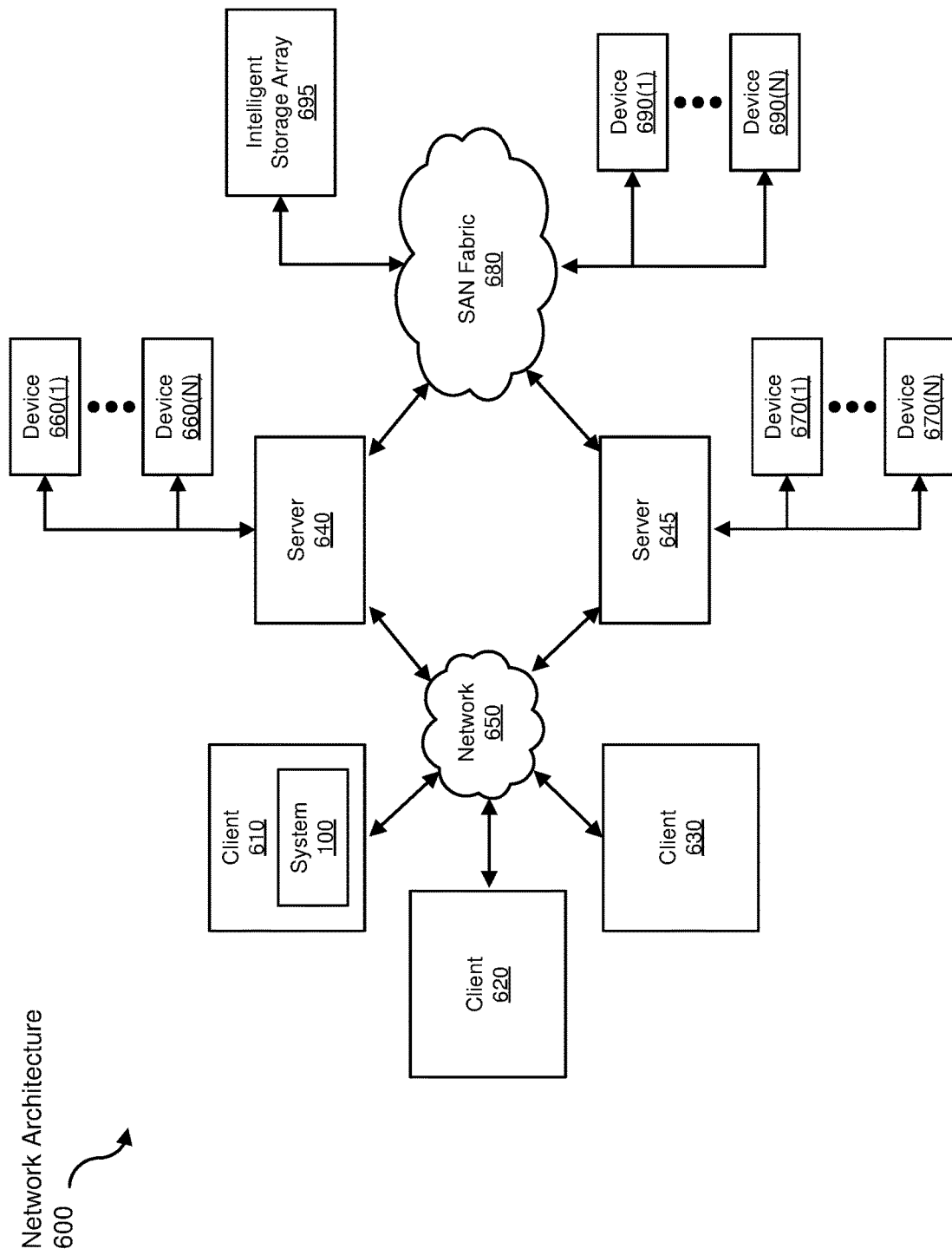
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(i)-(N) may be directly attached to server 645. Storage devices 660(i)-(N) and storage devices 670(i)-(N) generally represent any type or form of storage device or medium capable of storing data and/or other computer-readable instructions. In certain embodiments, storage devices 660(i)-(N) and storage devices 670(i)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(i)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(i)-(N) and array 695 appear as locally attached devices to client systems 610, 620, and 630. As with storage devices 660(1)-(N) and storage devices 670(i)-(N), storage devices 690(i)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(i)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(i)-(N), storage devices 670(i)-(N), storage devices 690(i)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for fingerprinting devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for fingerprinting devices, at least a portion of the method being performed by a computing device comprising at least one processor, the method comprising:
   detecting that a new device has attempted to connect to a network gateway;
   attempting to fingerprint the new device as an instance of a known candidate device type by:
      transmitting to the new device, by a security application, a set of network messages that mimic network messages that a second application is configured to transmit to instances of the known candidate device type; and
      confirming, by the security application based on a response from the new device to the set of network messages, that the new device is the instance of the known candidate device type; and
   performing a security action to protect a network corresponding to the network gateway based on confirming that the new device is the instance of the known candidate device type;
   wherein the set of network messages is identified by:
      crawling an online application distribution platform;
      performing a network message analysis for each one of multiple device-specific applications extracted from the online application distribution platform; and
      detecting, based on each respective network message analysis, a respective set of network messages that uniquely identifies each one of the multiple device-specific applications.

2. The computer-implemented method of claim 1, wherein the network gateway executes the security application.

3. The computer-implemented method of claim 1, wherein the set of network messages is unique according to a backend server analysis of multiple device-specific applications.

4. The computer-implemented method of claim 3, wherein the backend server analysis of multiple device-specific applications indicates that the second application is configured to transmit the set of network messages while a remainder of the multiple device-specific applications is not so configured.

5. The computer-implemented method of claim 1, wherein the network message analysis comprises at least one of:
   dynamic analysis based on an execution of a respective device-specific application;
   static analysis based on disassembling code for the respective device-specific application; or
   symbolic execution of the respective device-specific application.

6. The computer-implemented method of claim 1, wherein the new device comprises an Internet-of-things device.

7. The computer-implemented method of claim 6, wherein the second application is specific to the Internet-of-things device and comprises an Internet-of-things management application that executes on a user mobile device to pair the user mobile device with the Internet-of-things device and manage the Internet-of-things device.

8. The computer-implemented method of claim 1, wherein fingerprinting the new device comprises identifying at least two of:
   a make of the new device;
   a type of the new device;
   a model of the new device; and
   a firmware version of firmware installed on the new device.

9. The computer-implemented method of claim 1, wherein the set of network messages is extracted based on an analysis of the second application.

10. The computer-implemented method of claim 9, wherein the set of network messages is extracted based on the analysis of the second application without access to any instance of the known candidate device type.

11. A system for fingerprinting devices, the system comprising:
   a detection module, stored in memory, that detects that a new device has attempted to connect to a network gateway;
   a fingerprinting module, stored in memory, that attempts to fingerprint the new device as an instance of a known candidate device type by:
      transmitting to the new device, as part of a security application, a set of network messages that mimic network messages that a second application is configured to transmit to instances of the known candidate device type; and
      confirming, as part of the security application and based on a response from the new device to the set of network messages, that the new device is the instance of the known candidate device type;
   a performance module, stored in memory, that performs a security action to protect a network corresponding to the network gateway based on confirming that the new device is the instance of the known candidate device type; and
   at least one physical processor configured to execute the detection module, the fingerprinting module, and the performance module;
   wherein the fingerprinting module is configured to identify the set of network messages by:
      crawling an online application distribution platform;
      performing a network message analysis for each one of multiple device-specific applications extracted from the online application distribution platform; and detecting, based on each respective network message analysis, a respective set of network messages that uniquely identifies each one of the multiple device-specific applications.

12. The system of claim 11, wherein the network gateway executes the security application.

13. The system of claim 11, wherein the set of network messages is unique according to a backend server analysis of multiple device-specific applications.

14. The system of claim 13, wherein the backend server analysis of multiple device-specific applications indicates that the second application is configured to transmit the set of network messages while a remainder of the multiple device-specific applications is not so configured.

15. The system of claim 11, wherein the network message analysis comprises at least one of:
dynamic analysis based on an execution of a respective device-specific application;
static analysis based on disassembling code for the respective device-specific application; or
symbolic execution of the respective device-specific application.

16. The system of claim 11, wherein the new device comprises an Internet-of-things device.

17. The system of claim 16, wherein the second application is specific to the Internet-of-things device and comprises an Internet-of-things management application that executes on a user mobile device to pair the user mobile device with the Internet-of-things device and manage the Internet-of-things device.

18. The system of claim 11, wherein the fingerprinting module fingerprints the new device by identifying at least two of:
a make of the new device;
a type of the new device;
a model of the new device; and
a firmware version of firmware installed on the new device.

19. The system of claim 11, wherein the set of network messages is extracted based on an analysis of the second application.

20. A non-transitory computer-readable medium comprising one or more computer-readable instructions that, when executed by at least one processor of a computing device, cause the computing device to:
detect that a new device has attempted to connect to a network gateway;
attempt to fingerprint the new device as an instance of a known candidate device type by:
transmitting to the new device, by a security application, a set of network messages that mimic network messages that a second application is configured to transmit to instances of the known candidate device type; and
confirming, by the security application based on a response from the new device to the set of network messages, that the new device is the instance of the known candidate device type; and
perform a security action to protect a network corresponding to the network gateway based on confirming that the new device is the instance of the known candidate device type;
wherein the set of network messages is identified by:
crawling an online application distribution platform;
performing a network message analysis for each one of multiple device-specific applications extracted from the online application distribution platform; and
detecting, based on each respective network message analysis, a respective set of network messages that uniquely identifies each one of the multiple device-specific applications.

\* \* \* \* \*